United States Patent [19]

Matai et al.

[11] Patent Number: 4,786,901
[45] Date of Patent: Nov. 22, 1988

[54] PAGING RECEIVER

[75] Inventors: Masahiro Matai; Takashi Ohyagi; Toshihiro Mori, all of Tokyo, Japan

[73] Assignee: NEC Corporation, Japan

[21] Appl. No.: 89,227

[22] Filed: Jul. 28, 1987

Related U.S. Application Data

[63] Continuation of Ser. No. 711,089, Mar. 12, 1985, abandoned.

[30] Foreign Application Priority Data

Mar. 13, 1984 [JP] Japan .................................. 59-46582

[51] Int. Cl.⁴ .......................... G08B 5/22; H04Q 7/00
[52] U.S. Cl. ........................... 340/825.47; 340/825.44; 340/825.27; 455/38
[58] Field of Search ............... 379/57, 59; 340/825.44, 340/825.47, 825.48, 825.26, 825.27; 455/38

[56] References Cited

U.S. PATENT DOCUMENTS 4,110,743  8/1978  Zahnd .......................... 340/825.47
4,383,257  5/1983  Giallanza et al. ............... 340/825.44
4,427,980  1/1984  Fennell et al. .................. 340/825.47
4,473,824  9/1984  Claytor .......................... 340/825.27
4,477,808  10/1984 Ichikawa ........................ 340/825.44

FOREIGN PATENT DOCUMENTS 0121762  9/1980  Japan ............................. 340/825.47

Primary Examiner—Robert L. Griffin
Assistant Examiner—Ralph E. Smith
Attorney, Agent, or Firm—Laff, Whitesel, Conte & Saret

[57] ABSTRACT

In a paging receiver with an individual paging number and at least one common paging number, there is provided memory means including individual memory means including individual memory areas capable of storing at least one message signal following the individual number and specific memory areas storing message signals following the common paging number. The receiver can protect individual address information and can efficiently utilize the memory areas even when the user does not use all common addresses.

4 Claims, 9 Drawing Sheets

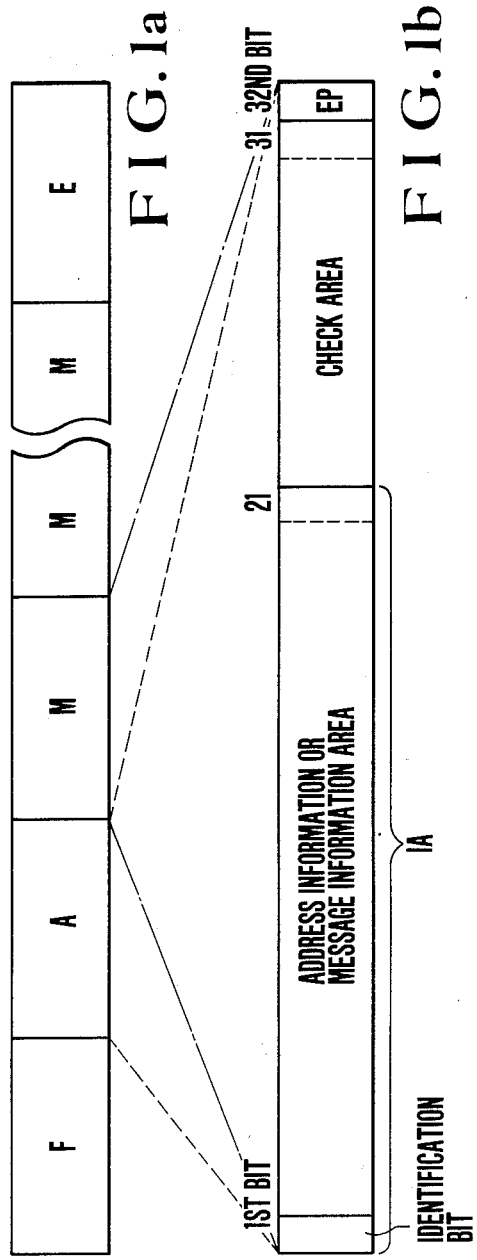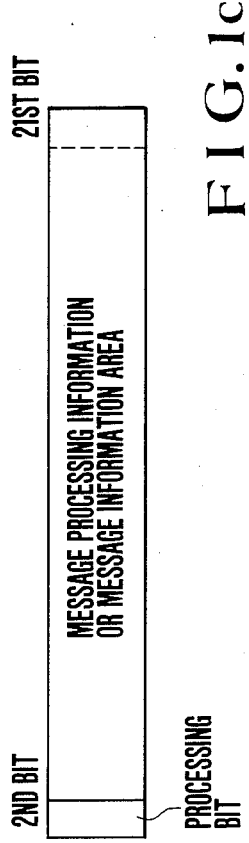

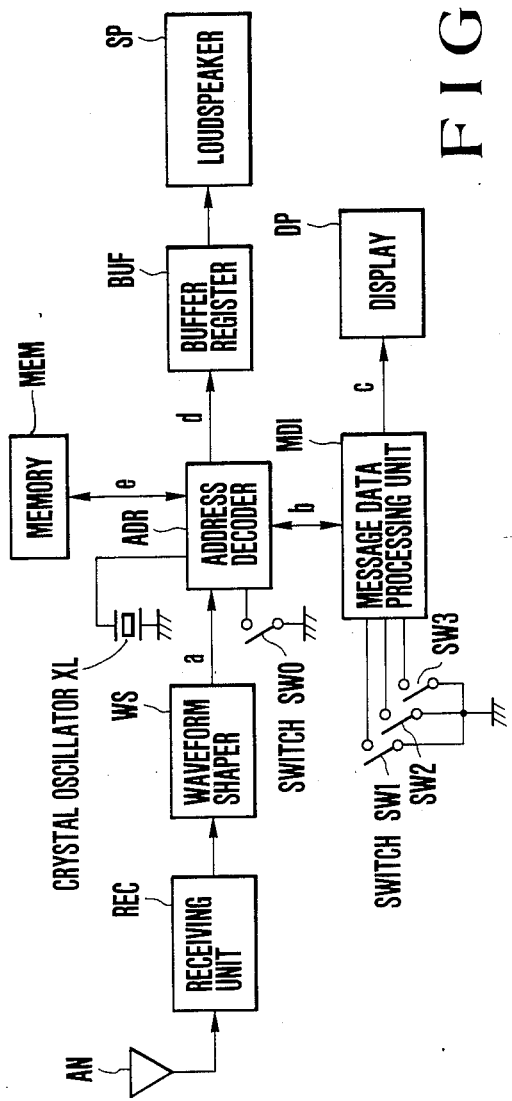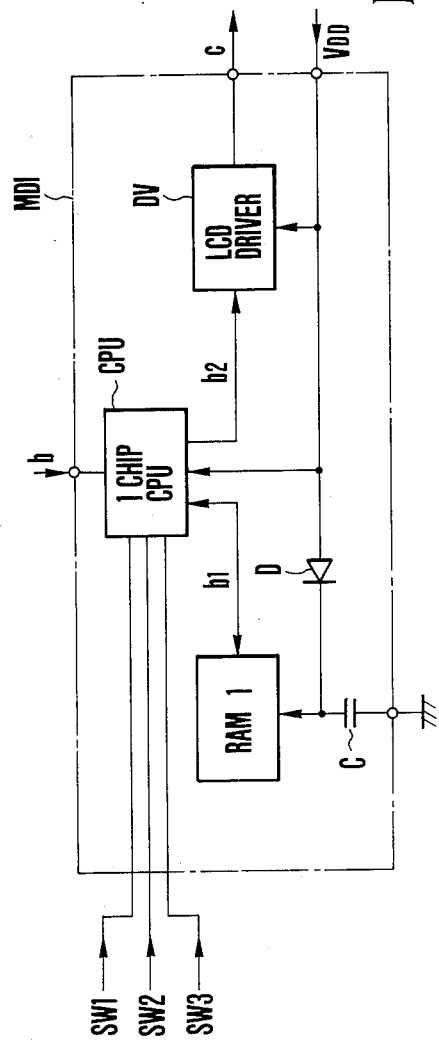

|     |     |
| --- | --- |
| M1  | F1  |
| M2  | F2  |
| M3  | F3  |
| M4  | F4  |
| Mi  | :   |
| Mn  | 0   |

FIG.6a

| | | | | | |
|---|---|---|---|---|---|
| F1 | S0 | S1 | S3 | 0 | 0 |
| F2 | S2 | 0 | 0 | 0 | 0 |
| F3 | S4 | 0 | 0 | 0 | 0 |
| F4 | S9 | S10 | 0 | 0 | 0 |
| Fj | : | | | | |
| Fm | 0 | 0 | 0 | 0 | 0 |

FIG.6b

| | | | | | |
|---|---|---|---|---|---|
| S0 | P | L | E | A | S | E |
| S1 | | G | O | | T | O |
| S2 | 0 | 4 | 5 | 9 | 7 | 6 |
| S3 | | H | O | M | E | |
| Sk | : | | | | | |
| Sℓ | | | | | | |

FIG.6c

| M1 | M2 | M3 | M4 | M5 | MST | Mn |
|---|---|---|---|---|---|---|
| 0 | 1 | 1 | 0 | 0 | --------- | 0 |

FIG.6d

| F1 | F2 | F3 | F4 | FST | Fm |
|---|---|---|---|---|---|
| 1 | 1 | 1 | 1 | | 0 |

FIG.6e

| S0 | S1 | S2 | S3 | SST | Sℓ |
|---|---|---|---|---|---|
| 1 | 1 | 1 | 1 | | |

IFN

FIG.6h

ISN

STAD

PAGING RECEIVER

This application is a continuation of application Ser. No. 06/711,089, filed Mar. 12, 1985, now abandoned.

BACKGROUND OF THE INVENTION

This invention relates to a paging receiver and more particularly a paging receiver having an individual paging number and at least one common paging number.

In advanced modern information communities importance of information has been increased drastically.

As the amounts of information increase, many types of information receivers for reception of valuable information have been developed, including a receiver capable of receiving only paging numbers or signals, a receiver capable of also receiving a series of messages constituted by digits and letters, a receiver having multiaddresses, to improve receiving performance.

The addresses of the multiaddress information receivers can be classified into (a) addresses corresponding to conventional paging services (hereinafter termed individual addresses) and (b) common addresses corresponding to information services (hereinafter termed common addresses).

Included in types of information that can be received by using the individual addresses (hereinafter termed individual address information) are addresses and telephone numbers of customers or users which should be confirmed at the time of receiving, and which should therefore be stored in memory means, although the frequency of receiving the addresses and telephone numbers is relatively small. On the other hand, included in types of information that can be received by using the common addresses (hereinafter termed common address information) are stock price information, merchandise trading information, or the like information. Since these types of information change from time to time, old information is of little value. Also, these types of information are frequently received at a rate of a predetermined unit time.

However, where the individual address information and the common address information are processed with a conventional information receivers having memory areas inadequate for respective addresses, protection of the individual address information becomes impossible.

More particularly, the individual address information, like the common address information, is stored in a memory area. Accordingly, accumulation of the frequently received common address information expels the individual address information from the memory area of a limited capacity. This means that the memory area has no margin for the individual address information, thus raising a serious problem in for the protection of important information.

In other words, the memory area of the limited capacity can not be used efficiently for the individual address information of great value.

As described above, in a multiaddress information receiver has a problem of how to store information in respective addresses.

SUMMARY OF THE INVENTION

It is an object of this invention to provide a paging receiver capable of protecting an individual address information.

Another object of this invention is to provide a novel paging receiver capable of storing individual information and common address information in adequate memory areas and capable of efficiently utilizing the memory areas even when the user does not use all common addresses.

According to this invention, there is provided a paging receiver with an individual paging number and at least one common paging number, comprising memory means including individual memory areas capable of storing at least one message signal following the individual paging number, and specific memory areas storing message signals following the common paging number.

According to a modification of this invention, there is provided a paging receiver having an individual paging number and at least one common paging number, comprising first memory means including individual memory areas storing at least one message signal following the individual paging signal, and specific memory areas storing message signals following the common paging number; second memory means storing information which determines whether a service of the common paging number is to be rendered or not; and control means responsive to the content of the second memory means, for processing a specific memory area corresponding to a common paging number being not in service as the individual memory area.

BRIEF DESCRIPTION OF THE DRAWINGS

In the accompanying drawings:

FIGS. 1a to 1c are diagrams showing one example of the received signals utilized in this invention;

FIG. 2 is a block diagram showing one embodiment of the display paging receiver in accordance with this invention;

FIG. 3 is a block diagram showing the message processing unit employed in the embodiment shown in FIG. 2;

FIGS. 6a to 6l show one example of registers and memory areas utilized for message storing.

DESCRIPTION OF THE PREFERRED EMBODIMENTS

Figure 4:
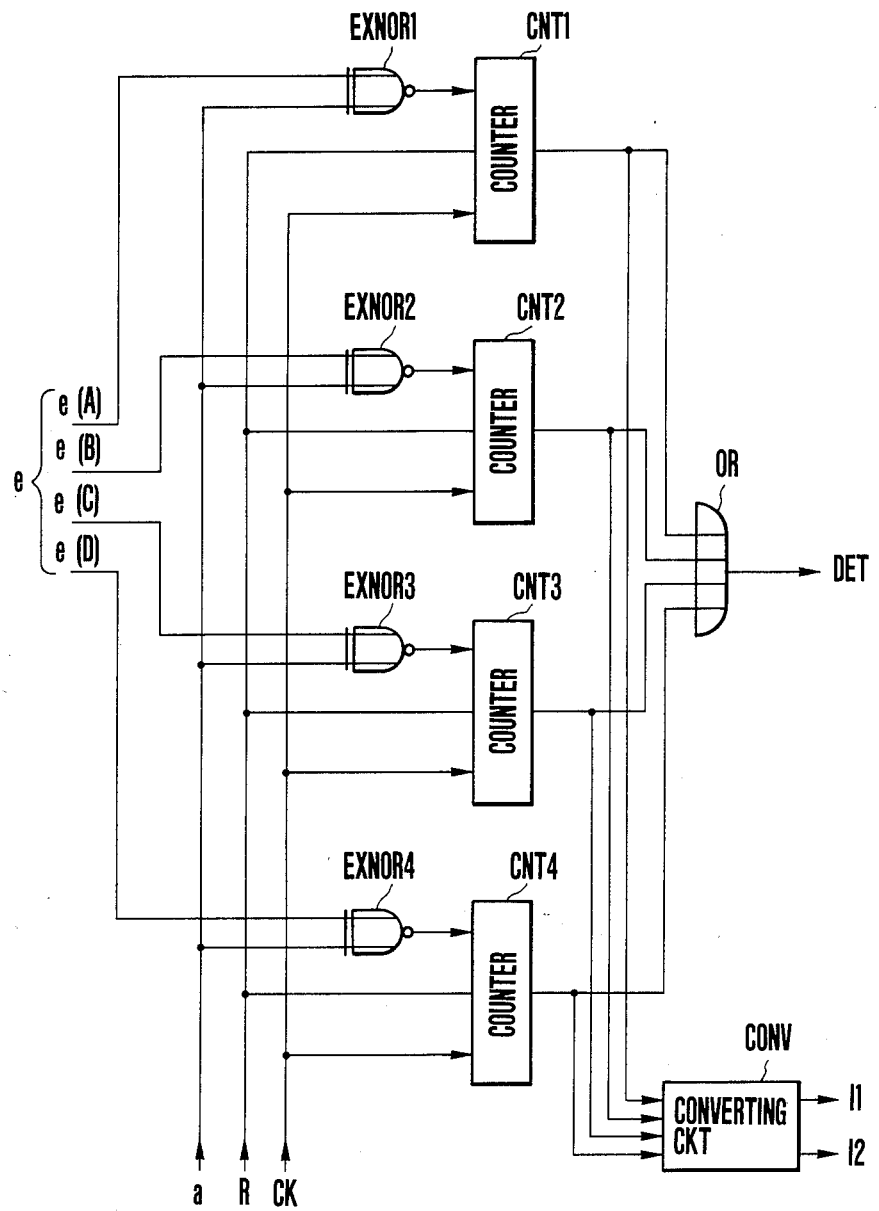
FIG. 4 is a block diagram showing one example of a paging signal detecting circuit utilized in this invention.

To facilitate understanding of the principle of this invention, one example of the received signals will first be described with reference to FIGS. 1a, 1b and 1c.

In FIG. 1a, F designates a frame synchronizing signal, A an address signal, M a message signal and E an end signal. If necessary, a plurality of message signals M are used depending upon the length of a message.

FIG. 1b shows a signal format wherein a signal comprising BCH (Bose-Chaudhuri-Hocquenghem) ending at 31st bit added with one parity bit at 32nd bit is used as the address signal or the message signal. This signal is made up of a 21-bit information area IA, 10-bit check area and 1-bit even parity bit EP, thus constituting one word with 32 bits. The information area utilizes its most significant bit (MSB) as an identification bit, and when its logic level is "0" this signal is processed as an address information signal, whereas when its logic level is "1" this signal is processed as a message information signal.

Remaining 20 bits are used as the address information or message information.

FIG. 1c shows a format of the message information of a message signal received after reception of an address signal. In FIG. 1c, the MSB (the second bit in the information area) is used as a processing bit and when its logic level is "0", the remaining 19 bits are processed as message processing information whereas when its logic level is "1", the remaining 19 bits are processed as message information. Regarding a succeeding message signal received after reception of a preceeding message signal, 20 bits except the identification bit of the information area are processed as the message information.

Referring to FIG. 2, a display paging receiver embodying this invention comprises an antenna AN, a receiving unit REC for demodulating a radio signal received by the antenna $AN_1$, a waveform shaper WS for shaping the waveform of the output of the receiving unit REC, an address decoder ADR, a memory MEM such a P-ROM for storing a plurality of paging numbers, a message data processing unit MDI, a buffer register BUF inputted with the output of the ADR, a loudspeaker SP connected on the output side of the BUF, a display DP for displaying the output of the unit MDI, a clock pulse generating crystal oscillator XL for generating a timing clock pulse applied to the ADR, a switch SWo connected to the ADR, the switch SWo being operated to send, via the ADR, variation information or state information to the unit MDI for effecting stopping of alert or the like and switches $SW_1$ to $SW_3$ connected to the unit MDI and used for operating the information receiver.

The display paging receiver shown in FIG. 2 operates as follows:

The radio signal received by the antenna AN is demodulated by the unit REC and the waveform of the demodulated signal is shaped by the shaper WS and then converted into a digital signal by the ADR.

Then, an address signal e read out from the memory MEM storing a plurality of paging numbers is applied the ADR which compares an input signal a from the shaper WS with the signal e bit by bit. When coincidence of the paging numbers is confirmed, the ADR applies a starting signal b to the unit MDI. This unit MDI performs reception and demodulation of the message signal M (shown in FIG. 1) in accordance with the starting signal b, and when it detects an end signal or stop signal E shown in FIG. 1 indicative of the end of the message, it sends the signal b to the ADR. In response to this signal b, the ADR sends an alert signal d to the BUF to drive the loudspeaker SP, thereby informing the user of the receiver that it is called. The unit MDI stores in its internal RAM, not shown, the decoded signal of the message signal M and sends a signal c to the display DP to provide visual information.

FIG. 3 shows the detailed construction of the unit MDI shown in FIG. 2, which comprises a one-chip CPU supplied with signal b from the ADR shown in FIG. 2 and information from switches $SW_1$ to $SW_3$, and a random access memory $RAM_1$ which exchanges a signal $b_1$ between it and the one-chip CPU. The memory $RAM_1$ corresponds to first memory means including individual memory areas storing at least one message signal following individual paging numbers and specific area storings message signals following a common paging number.

The message data processing unit MDI also includes an LCD (liquid crystal display) power driver DV supplied with a signal $b_2$, a diode D, a capacitor C and a source $V_{DD}$ which are connected as shown.

FIG. 4 shows details of the address detection circuit (paging signal detection circuit) in the ADR shown in FIG. 2, for a case wherein the number of addresses is four.

The address detection circuit shown in FIG. 4 comprises Exclusive NOR gates $EX.NOR_1$ to $EX.NOR_4$ respectively inputted with the address data signal e from the memory MEM shown in FIG. 2 and input data a, counters $CNT_1$ to $CNT_4$ respectively inputted with the output signals of the Exclusive NOR gates $EX.NOR_1$ to $EX.NOR_4$ and a clock pulse CK and are cleared at a rate of 32 bits by a signal suppleed to a terminal R, an OR gate OR inputted with the outputs of the counters $CNT_1$ to $CNT_4$, and a converting circuit CONV inputted with the outputs of the counters $CNT_1$ to $CNT_4$ for converting the outputs into two bits ($I_1$, $I_2$). In FIG. 4, e(A), e(B), e(C) and e(D) designate address data signals inputted to the gates $EX.NOR_1$ to $EX.NOR_4$, respectively.

In the circuit shown in FIG. 4, the input data a and the address data e from the memory MEM are compared by the gates $EX.NOR_1$ to $EX.NOR_4$ and the counters $CNT_1$ to $CNT_4$ bit by bit. Although the counters are cleared at the rate of 32 bits by a signal applied to terminal R, when more than 29 bits coincide with each other before, they are cleared, the gate OR outputs a signal DET.

Since the output signals of the counters $CNT_1$ to $CNT_4$ are supplied to the input terminals of the gate OR, so long as there is a counter output signal DET, the gate OR delivers out this signal. In the embodiment shown in FIG. 4 wherein the number of the addresses is four, the converter circuit CONV converts the address into received address information ($I_1$, $I_2$) of two bits.

Figure 5:
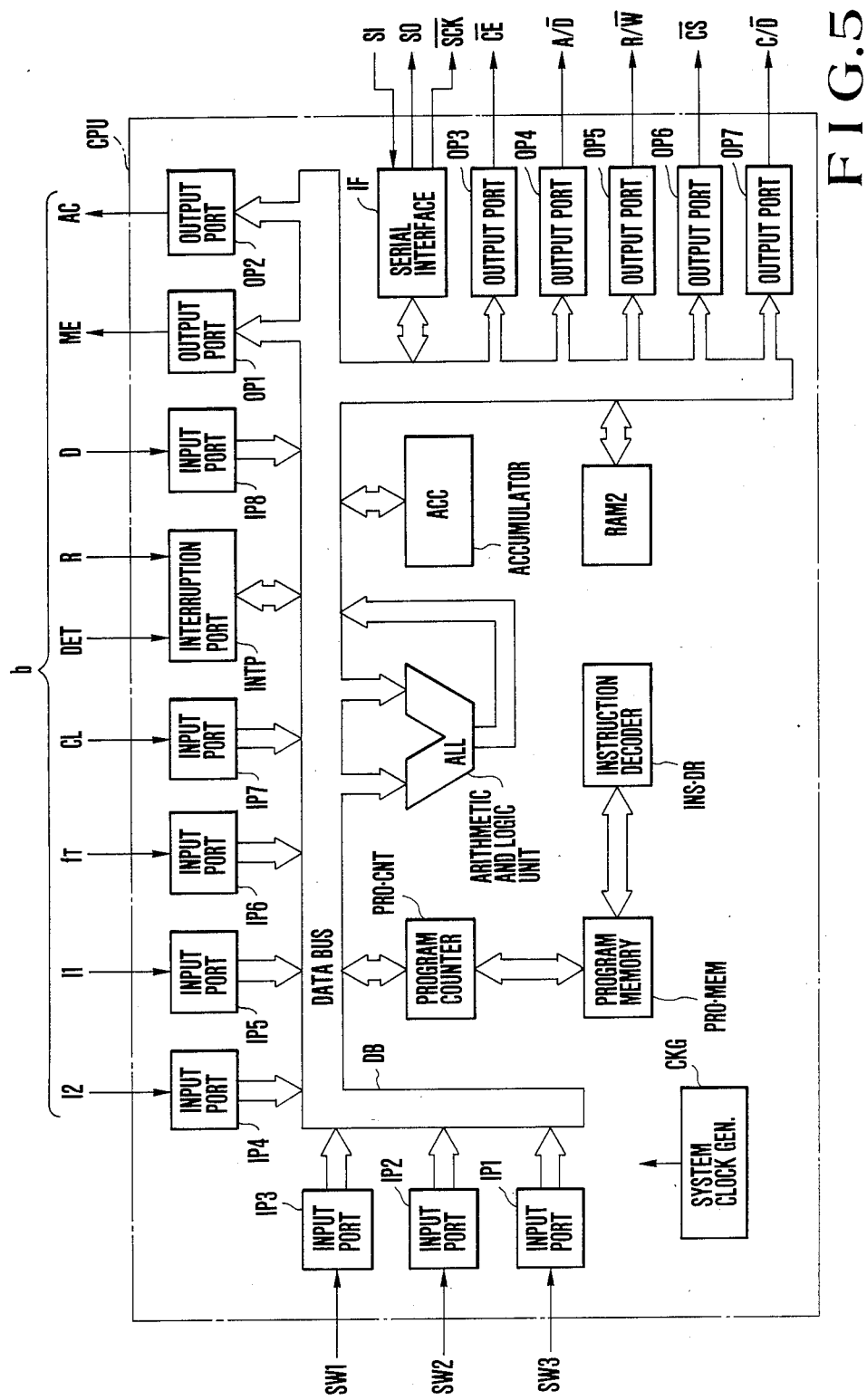
FIG. 5 is a detailed block diagram showing one chip CPN shown in FIG. 3.

FIG. 5 is a block diagram showing the detailed construction of the one-chip CPN shown in FIG. 3, which comprises input ports $IP_1$, $IP_2$ and $IP_3$ respectively inputted with the outputs of switches $SW_3$, $SW_2$ and $SW_1$, and input ports $IP_4$, $IP_5$, $IP_6$, $IP_7$ and $IP_8$ respectively inputted with the signal b from the address decoder ADR shown in FIG. 2 including data (received address information) $I_2$ and $I_1$ representing the address, a timing frequency $f_T$, a clock pulse CL corresponding to the transmission speed, and a message signal D. Denoted by $OP_1$ and $OP_2$ are output ports which send to the address decoder ADR shown in FIG. 2 a signal ME showing that the message has ended and an alert control signal AC, and denoted by $OP_3$, $OP_4$ and $OP_5$ are output ports sending to the random access memory $RAM_1$ control signals $\overline{CE}$, $A/\overline{D}$ and $R/\overline{W}$. Denoted by $OP_6$ and $OP_7$ are output ports sending to the LCD driver DV shown in FIG. 3 control signals $\overline{CS}$ and $C/\overline{D}$. Denoted by INTP is an interruption port inputted with the signal DET indicative of the address coincidence in the signal b from the address decoder ADR shown in FIG. 2 and an access signal R from switch $SW_1$, etc. Denoted by IF is a serial interface inputted with an input signal SI from the memory $RAM_1$ shown in FIG. 3 for sending an output signal SO and a system clock signal $\overline{SCK}$ to the LCD driver DV shown in FIG. 3, and denoted by DB is a data bus.

There are also provided a program counter PRO.CNT designating the contents of address, a program memory PRO.MEM storing an instruction sequence to be executed and accessed by the content of an address designated by the program counter PRO.CNT, an arithmetic and logic unit ALL executing such various operations as an arithmetic operation, logic operation, or the like, an instruction decoder INS.DR which decodes information from the program memory PRO.-MEM for supplying a control signal corresponding to the instruction to various parts of the circuit, and a random access memory $RAM_2$ utilized to store various data, subroutines, program count at the time of interruption, and retreat of a program status. The random access memory $RAM_2$ corresponds to first memory means constituted by individual memory areas storing at least one message signal following the individual paging numbers and memory areas storing message signals following a common paging signal. Denoted by ACC is an accummulator utilized to transmit and receive data between the random access memory $RAM_2$ and various ports. Denoted by CKG is a system clock generating circuit generating a clock pulse that determines generating a clock pulse that determines an instruction execution cycle time.

The one chip CPU and the address decoder DR shown in FIG. 2 exchange therebetween data (received address information) $I_1$, $I_2$ representing the address, a clock pulse CL corresponding to the transmisson speed, the timing frequency $f_T$, the signal DET indicative of the address coincidence, the access signal R from switches $SW_1$ to $SW_3$ the message signal D, the signal ME informing the address decoder ADR of the fact that the message has ended, and the alert control signal AC. Furthermore, the one-chip CPN and the memory $RAM_1$ constituting the memory means shown in FIG. 3 exchange therebetween the system clock signal $\overline{SCK}$, output signal SO, input signal ST and control signals $\overline{CE}$, $A/\overline{D}$ and $R/\overline{W}$. Furthermore, the one-chip CPU and the LCD driver DV shown in FIG. 3 exchange the system clock pulse $\overline{SCK}$, the output signal SO and the control signals $\overline{CS}$ and $C/\overline{D}$.

FIGS. 6a through 6l show examples of the registers and memory areas utilized for the message storing processings.

The registers and memory areas will be described below.

FIG. 6a shows one example of the construction of the memory area in which areas $M_1$ to $M_n$ store message file numbers Fj corresponding to individual address information or the common address information and its individual addresses show the present state (new or old) of the information. The initial values of the data in the areas $M_1$ to $M_n$ are all "0" meaning that there is no message stored. In this case, the data of Mj is designated by (Mj). By using this designation, $(M_3)$ is $F_2$, for example.

FIGS. 6b and 6c show examples of a file area and a sector area respectively in which file $F_1$ to $F_m$ are assigned to respective corresponding message file numbers. In each file, sector names constituting message information are sequentially stored. Like Mj shown in FIG. 6a, the date stored in the file Fj shown in FIG. 6b is indicated by (Fj). More particularly, in the example shown in FIG. 6b, file $F_1$ is constituted by three sectors $S_0$, $S_1$ and $S_3$ in which message information is stored.

Sectors So to Sk are also assigned corresponding to respective sector numbers and the message information is stored in these sector areas. The data in sector Sk is indicated by (Sk) and in FIG. 6c of this embodiment, (So) shows that 6 charactors "PLEASE" are stored. The message information is sequentially stored in the sectors.

Thus, it can be noted that for file $F_1$ the message information is constituted by three sectors $S_0$, $S_1$ and $S_3$ to mean "PLEASE GO TO HOME".

The memory area shown in FIG. 6a, is located in the $RAM_2$ shown in FIG. 5, and the file area shown in FIG. 6b and the sector area shown in FIG. 6c are located in the memory $RAM_1$ shown in FIG. 3.

Registers MST(MSTATUCS), FST(FSTATUCS) and SST(SSTATUCS) shown in FIGS. 6d, 6e and 6f respectively will now be described.

Registers FST and SST shown in FIGS. 6e and 6f respectively store states of use of the file and the sector, and "0" indicative of out-of-use or "1" indicative of in-use is stored in respective files and sectors. Accordingly, by using these registers, it is possible to know idle (vacant) files and idle sectors. The data of registers FST and SST are represented by FLST(Fj) and SCST(Sk). More particularly, FLST($F_3$) shows that the data in a bit $F_3$ of the register FST is "0" or "1". In this embodiment "1" is present. Similarly, in this embodiment, SCST($S_2$).

In the case of the register MST (shown in FIG. 6d) that designates the memory area storing the common address information, it is used as a register storing a fixed state of the memory area. In other words, this register is used for storing data as to whether memory area is used for storing the common address information or the individual address information. In this embodiment, when memory area is used for the common address information, the data is "1", used for the individual address information, the data is "0". Each bit of the register MST showing the mode of processing of the memory area corresponds to each address in one-to-one correspondence relationship. As a consequence, where there are four addresses A, B, C and D of which A is usable as an individual address, B and C are usable as common addresses, but D is not neccessary to be used as a common address, it is possible to use the memory areas corresponding to the out-of-use common address for the individual address information by making "0" the state of a bit of the register MST shown in FIG. 6d which is in one-to-one correspondence relationship with the common address D. The data of this register MST is represented by MST(Mj). Thus, MST($M_3$) is "1".

Registers MST, FST and SST shown in FIGS. 6d, 6e and 6f are built in the memory $RAM_2$ shown in FIG. 5.

Registers shown in FIGS. 6g, 6h, 6i, 6j, 6k and 6l operate as follows. These registers are also built in the memory $RAM_2$ shown in FIG. 5.

A register AD shown in FIG. 6g is adapted to store the received address information ($I_1$, $I_2$) (see FIGS. 4 and 5), while a register IFN shown in FIG. 6h is used for storing an idle file number when there is an idle file, and its state is "0" when there is no idle file. A register ISN shown in FIG. 6j is adapted, like the register IFN, to store an idle sector number when there is an idle sector, and its state is "0" when there is no idle sector.

A register SC shown in FIG. 6j is for storing the number of sectors in use in one file, and a register STAD shown in FIG. 6k is for storing address number to be stored with message information. A register FI shown in FIG. 6 is used for storing the sector number constituting a file. When storing of the sector numbers of one file completes, the data is sent to the file area of the memory RAM, shown in FIG. 3.

Figure 8:
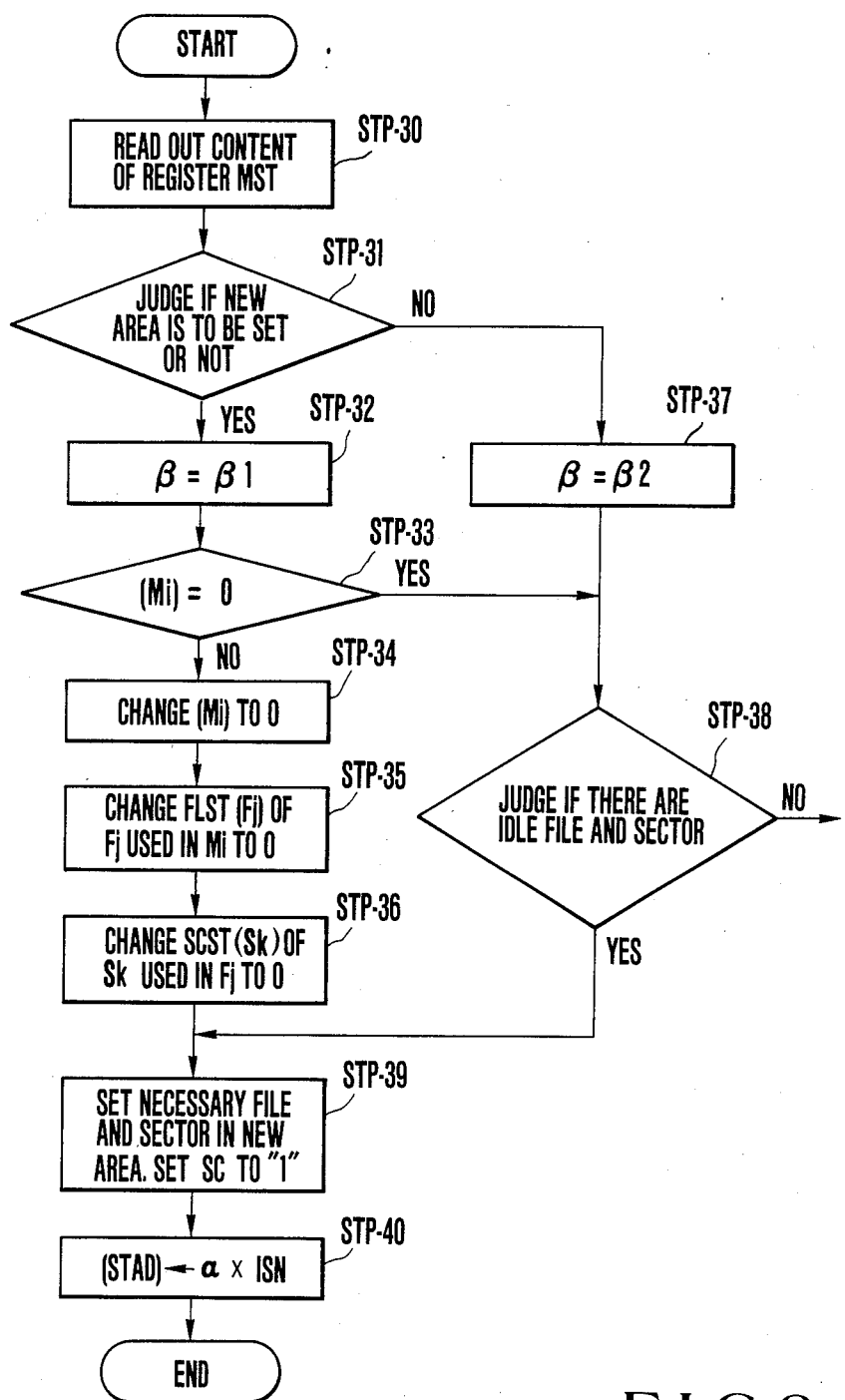
Figure 9:
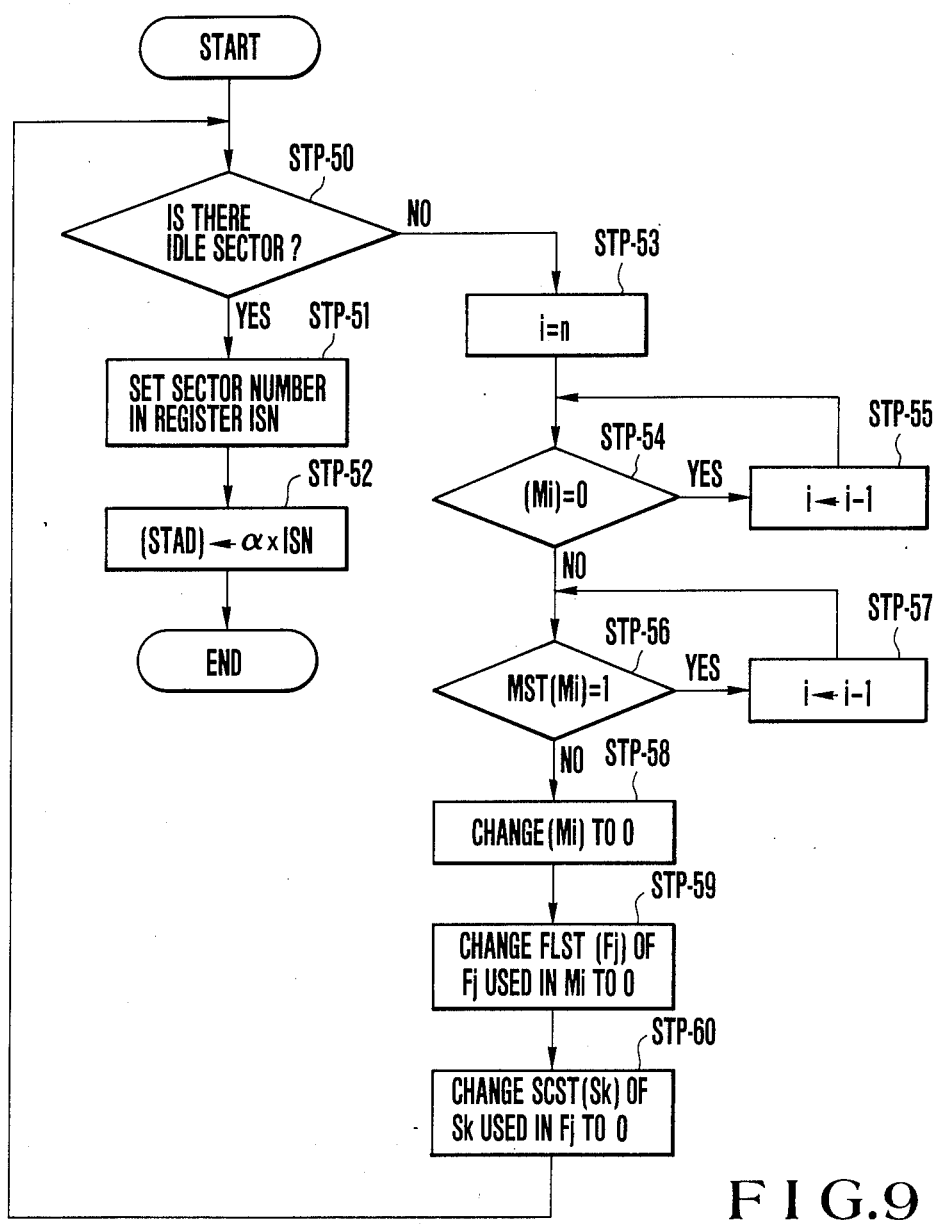
Figure 10:
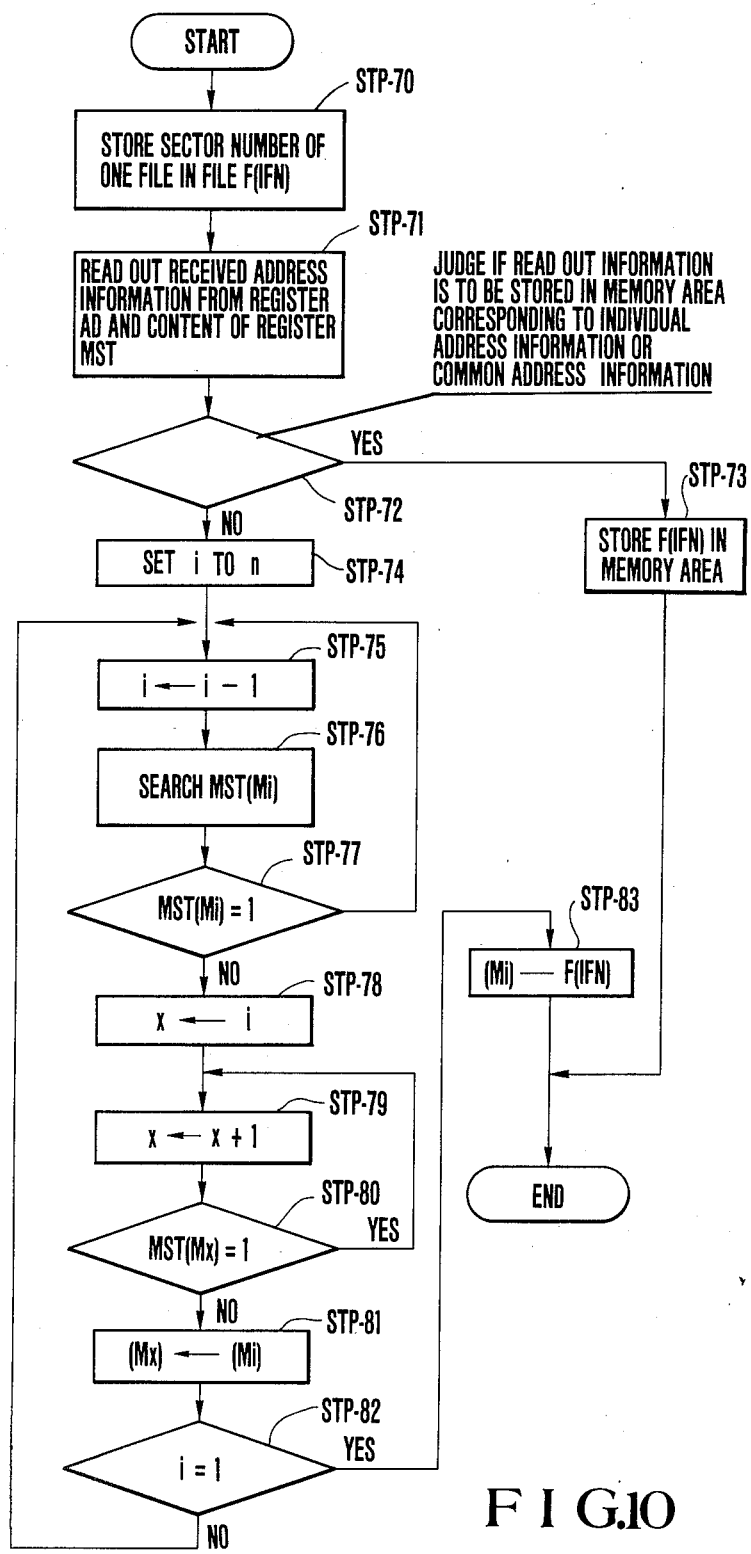

The received signal, various circuits, the construction and function of the registers constituting the memory means have been described above. The processing of the received signal will now be described with reference to the flow charts shown in FIGS. 7 to 10 in which FIG. 7 shows a flow chart showing one example of the processing of the received signal, and FIGS. 8 to 10 are detailed flow charts showing steps 13, 22 24 shown in FIG. 7.

Figure 7:
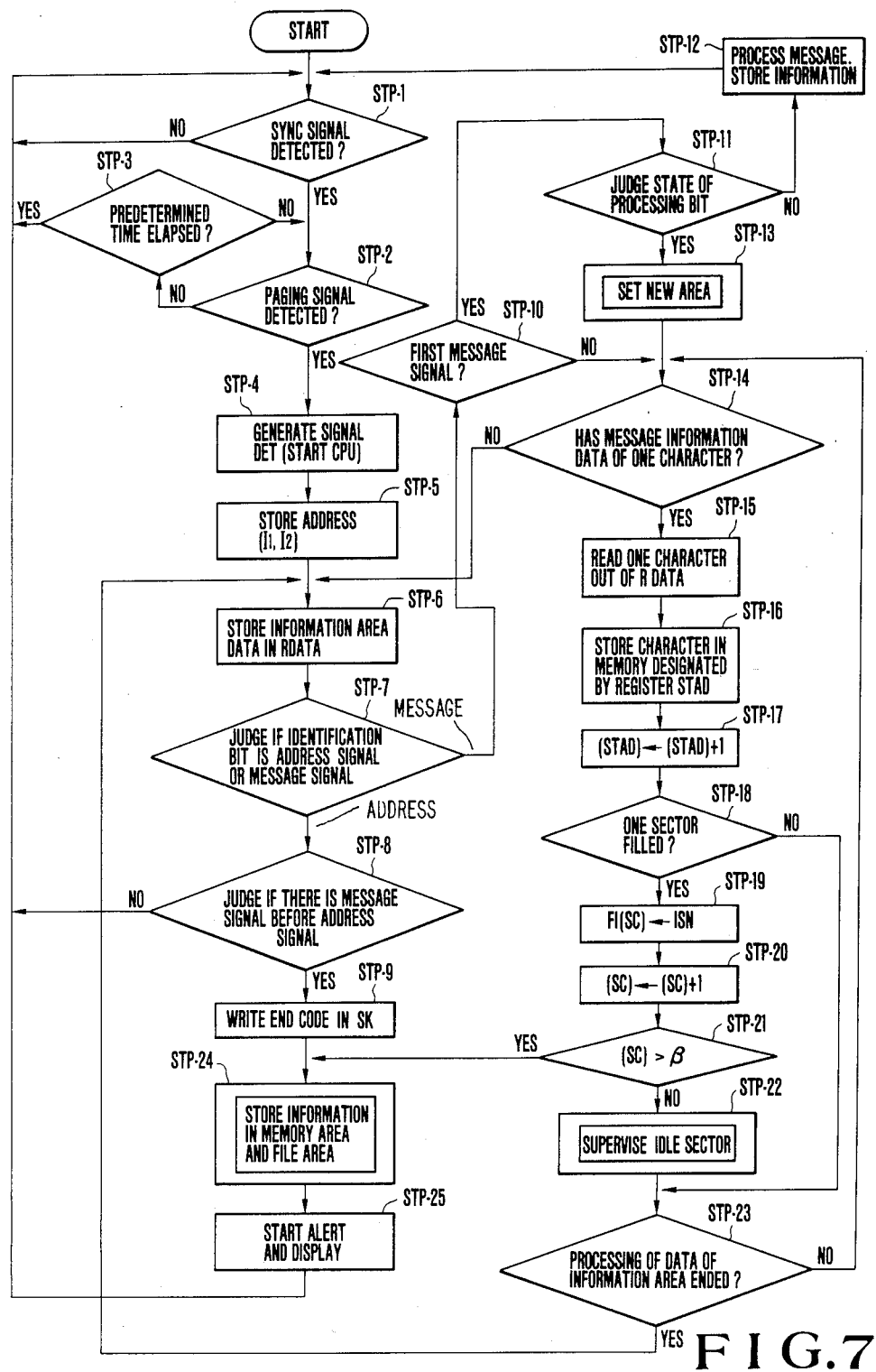
FIGS. 7 to 10 are flow charts for explaining the operation of this invention.

In FIG. 7, the receiver is at the initial state waiting for a synchornising signal. At step STP-1, when the synchronizing signal is detected the receiver is brought to a state for waiting for the reception of a paging number corresponding to that stored in the memory MEM (see FIG. 2) of the receiver. If the circuit shown in FIG. 4 can not detect the paging number of the receiver which has been stored in the memory MEM (P-ROM) shown in FIG. 2 even after lapse of a predetermined time following the receipt of the synchronizing signal (see STP-2 and STP-3), the program is returned to the initial state.

When the result of judgment of STP-2 is YES, the OR gate circuit OR shown in FIG. 4 detects signal DET to start the one chip CPU shown in FIG. 3 and to convert the received address into two-bit address information $(I_1, I_2)$ by the converter CONT at STP-4. Consenquently, the received address information $(I_1, I_2)$ and the message signal "D" shown in FIG. 5, that is the received signal which are sent from the address decoder ADR shown in FIG. 2 are supplied to the one-chip CPU to be processed thereby and the result of proessing is stored in the memory $RAM_2$ shown in FIG. 5 as shown by steps STP-5 and STP-6. At setp STP-7, the arithmetic and logic unit ALL shown in FIG. 5 checks the identification bit of the received signal to judge whether the received signal is an address signal or a message signal.

When the received signal is an address signal, at step STP-8, a judgment is made as to whether there is a message signal before the address signal. More particularly, when the register SC shown in FIG. 6*j* is judged and a sector is used as the message information, at step STP-9, and end code is written into a sector area to execute storing, and display of the message information.

Where a sector is not used as a message information, it is judged that there is no message information sent by using the paging number of the our receiver and the processing returns to the initial state.

Further, at step STP-7, when the received signal is judged as a message signal, at step STP-10, after starting the one chip CPU shown in FIG. 3 a judgement is made as to whether the message signal is the first message signal or not. When the result of judgment is YES, at step STP-11, a judgment of the state of the processing bit is made. When the state of the processing bit is "0", the received signal is stored in the register MST shown in FIG. 6*d* as an message information at step STP-12 at which the message signal is decoded to obtain information which determines whether serive of the common paging signal is to be rendered or not.

Although in this embodiment, only the data of register MST was taken as the message processing information, other data representing the value of $\beta$ to be described hereinafter can also be used. Although, in this embodiment, upon completion of the storing, the program is returned to the initial state, if desired, information and display of the completion of the setting of the register MST may be informed and displayed. When it is judged that the data is message information, at step STP-13, a new area is set.

The setting of the new area will be described with refernece to FIG. 8.

When the data is judged as message information, the received address informaton $(I_1, I_2)$ is read out of the register AD shown in FIG. 6*g*, and the content of the register MST shown in FIG. 6*d*, in one-to-one correspondence relationship to the received address information $(I_1, I_2)$, is read out at step STP-30. Based on the content of MST, it is judged whether a new area is to be set for the individual or common address information at step STP-31. More specifically, if MST(Mi)=0, the new area is to be set for the individual address information and the process goes on to step STP-37. If MST(Mi)=1, the new area is to be set for the common address information and step STP-32 follows. At this stage, $\beta$ utilized in steps STP-32 and STP-37 will be described.

Denoted by $\beta$ is the number of sectors that can be used in one file, and $\beta_1$ and $\beta_2$ are values respectively corresponding to the common address information and the individual address information. For example, where the number of sectors each of which can store 32 charactors is 36, it is possible to store messages of at least 4 files. As a result, if three common addresses are used, it is possible to store only one individual address information at the worst. On the other hand, if $\beta_1$ and $\beta_2$ are differently set to 6 and 9, respectively, at least two pieces of individual address information can be stored even if three common addresses are used. By setting the values of $\beta_1$ and $\beta_2$ in this way, the old individual address information can be recognized. Usually, the individual address information comprises a long message such as ordering an action but the common address information comprises a short message such as stock prices, so that the above-described performance is considered to be appropriate. The valves of $\beta_1$ and $\beta_2$ are selected in a manner as described above.

When the read-out MST content, MST(Mi), is decided to be 1, i.e., the received information is decided to be information relating to the common address in question, $\beta$ is set to be $\beta_1$ at step STP-32, and then a file and a section which have been used for that common address are cleared. More specifically, at step STP-33, adjustment is made as to whether file number Fj is stored in a memory areas corresponding to the received address information or not. When the result of judgment is NO, at steps STD-34, STP-35 and STP-36, the old information of the received common address is erased and the contents of registers FST and SST shown in FIGS. 6*e* and 6*f* which have been used for the old information are changed to "0" thereby enabling to use their files and sectors. When the file number Fj is not being stored in a memory area corresponding to the received common address information, that is, when an initial service is rendered at that common address, at step STP-38, a judgment is made as to whether there are an idle file and an idle sector or not. When the result of judgment is NO, the program returnes to the original state in this embodiment. But if desired, it is possible to inform the user that there is not an idle file and an idle sector by alerting or displaying this fact.

When the result of judgment at step STP-31 shows that the data is individual address information, at step STP-37, a value of $\beta$ is set to be $\beta_2$ which is suitable for the individual address informaton, then the process goes on to step STP-38

All pieces of initial or first message information after starting the CPU are advanced to step STP-39 to set necessary file and sector in a new area. In other words, the data in register FST (shown in FIG. 6e) corresponding to an idle file stored in register IFN shown in FIG. 6h is set to "1". In the same manner, the data of register SST (shown in FIG. 6e) corresponding to an idle sector stored in the register ISN shown in FIG. 6i is set to "1". Thus it is indicated that its file and sector are permitted for use. Moreover, since only one sector is used, the data of the register SC shown in FIG. 6j is set to "1".

Then, the first address of the sector to be used is set at step STP-40 in which $\alpha$ represents the number of characters that can be stored in one sector. For example, in the sector area shown in FIG. 6c, the number of characters that can be stored in one sector is 6, that is, $\alpha=6$. Suppose now that the idle sector number stored in the register ISN shown in FIG. 6i corresponds to the value of K; the sector number So becomes "0". The first address of the sector number So is "0", whereas the last address is "5". Since the sector number $S_1$ is "1", its first address is equal to the next address "6". In this manner, the first address of the used sector is expressed by $\alpha \times ISN$, thus terminating the setting of the new area.

The first message information or succeeding message information whose new area has been set at step STP-13 shown in FIG. 7 is judged as to whether the information has data of one character or not at step STP-14. When the result of judgment is NO, a succeeding message signal is subjected to the same processing to obtain data of more than one character. When the result of judgemnt at step STP-14 is YES, at steps STP-15, STP-16 and STP-17, the data of one character is stored in an address designated by the register STAD shown in FIG. 6b and the address designated by the register STAD is set as the next address. After that, at step STP-18, a judgment is made as to whether one sector has been filled or not. When the result of judgment is NO, the program is advanced to step STP-23 where a judgment is made as to whether the processing of the data of the information area has ended or not. When the processing is not terminated, the program is returned to step STP-14 to process the remaining data of the information area. In contrast, when the processing of the data of the information area has completed, the program is advanced to step STP-6 to being the processing of the next received signal.

When the result of judgment at step STP-18 is YES, the sector number stored in the register ISN shown in FIG. 6i is stored in the SC-th address of register FI shown in FIG. 6l (see step STP-19) and the number of used sectors is incremented by one at step STP-20. At the next step STP-21, the number of sectors used in one file is supervised. When the number of sectors used in one file is larger than $\beta$, storing of the message information is interrupted, and the program is advanced to step STP-24. When the number of the used sectors is less than $\beta$, at step STP-22, the idle sector is supervised.

The supervision of the idle sector will be described with reference to FIG. 9.

When it is judged that the number of files in one file is smaller than $\beta$, at step STP-50, a judgment is made as to whether there is a sector that can be used next. When there is an idle sector, at step STP-51, the sector number of the idle sector is set in the register ISN shown in FIG. 6i and at step STP-52, the first address number of the idle sector is set, whereas when there is no idle sector, a processing is executed to prepare an idle sector. In this processing, at steps STP-53, STP-54 and STP-55, judgments are made as to whether the file number Fj is sequentially stored in memory areas Mn through Mi shown in FIG. 6a. When the file number Fj is stored, at steps STP-56 an 57, a judgment is made as to whether the memory area corresponds to an individual address or to a common address. When the memory area corresponds to the individual address, the information stored therein is erased and the register FST shown in FIG. 6e and the register SST shown in FIG. 6f and utilized for that information are changed to "0" to render the file and sector useable (see steps STP-58, 59 and 60). In this manner, an idle sector is prepared, and the program is advanced to succeeding steps STP-50, 51 and 52.

The above description corresponds to the idle sector supervision.

Subsequent to the supervision of the idle sector executed at step STP-22, the program is advanced to step STP-23 where a judgment is made as to whether the processing of the data of the information area has ended or not. The storing of the information in the sector area and register FI shown in FIG. 6l is continued by repeating the process described above and is completed when the message information terminates (see STP-9) or when a sector of one file overflows (see step STP-21). Then, at step STP-24, the information is stored in the file area and the memory area.

The storing operation of the information in the file area and the memory area shown in FIGS. 6b and 6a will now be described with reference to the flow chart shown in FIG. 10.

The data of a sector number of one file stored in register FI (shown in FIG. 6l) in the random access memory RAM$_2$ (shown in FIG. 5) contained in the one chip CPU shown in FIG. 3 is sent to file F(IFN) shown by the register IFN (see FIG. 6b) of the RAM$_1$ shown in FIG. 3, so as to store the sector number of one file in the file F(IFN), at step STP-70. Then, at step STP-71, the received address information ($I_1$, $I_2$) is read out from the register AD shown in FIG. 6g, while at the same time the content of the corresponding register MST shown in FIG. 6d is read out. Then at step STP-72, a judgment is made as to whether the read out information is stored in a memory area corresponding to the individual address information or the common address information. In the case of the common address information, at step SEP-73, a number called file F(IFM) is stored in a memory area corresponding to the received common address. On the other hand, in the case of the individual address, the received address information is shifted within a memory area (shown in FIG. 6a) storing the individual address information to render idle (empty) the memory area $M_1$ at steps 74 to 82. More particularly, at step STP-74, i is set to n. Then, at steps STP-75 to 77, the number Mi of the memory area (shown in FIG. 6a) storing the individual address information is searched starting from $M_{n-1}$. At step STP-78, the value of i is changed to x, thus preserving Mi storing the individual address information.

At steps STP-79 and 80, the individual address information is stored by using the new variable x, and the number Mx of the memory area which is larger than Mi is searched. Then, at step STP-81, the individual address information (Mi) is changed to Mx. The change of the individual information from $M_{n-1}$ to $M_1$ is executed under the judgment executed at step STP-82. Upon completion of this change, the memory area $M_1$ shown in FIG. 6a becomes idle, so that a number termed file F(IFN) is stored in the memory area $M_1$ at step STP-83, thus completing the storing of the number in the file area shown in FIG. 6b and the memory area shown in FIG. 6a. Then, at step STP-25, the alerting and displaying are started and the program is returned to the initial state. The alerting is made by controlling the address decoder ADR shown in FIG. 2 with the alert control signal AC shown in FIG. 5, and then driving the loud-speaker SP via the buffer register BUF. A display is made on the display DP shown in FIG. 2 by controlling the LCD driver DV shown in FIG. 3 with the system clock signal $\overline{SCK}$ and output signal "SO" from the serial interface IF shown in FIG. 5, and the control signals ($\overline{CS}$, C/$\overline{D}$) from the output ports OP$_7$ and OP$_8$.

Although the invention has been described with reference to a case wherein the setting of MSTATUCS is made by a software message information processing of a received signal, it should be understood that the invention is not limited to this example and that any suitable hardware can be used. For example, for the one chip CPN shown in FIG. 3, may be provided input and output ports corresponding to respective receiving addresses, and the setting of MSTATNCS can be made by making respective input terminals to a high or low level.

As described above, according to this invention, RAM (shown in FIG. 5) of the one chip CPU shown in FIG. 3 is provided with a register AD (shown in FIG. 6g) capable of storing addresses and a register MST (Shown in FIG. 6d) designating the memory area of common address information so as to enable to store the individual address information and the common address information in memory areas according to the features of the address information. Accordingly, there is a merit that even when the user does not use all common addresses, the memory areas can be efficiently utilized.

As described above, according to this invention, with a simple construction, it is possible to store the individual address information and the common address information in memory areas commensurate with their features in accordance with the information from a register and to efficiently utilize the memory areas even when the user does not utilize all common addresses. Furthermore, the individual address information can be protected by providing memory areas corresponding to respective addresses. In an information receiver having a plurality of common addresses and memory areas corresponding to respective common addresses, where the user does not require specific common address information, efficient utilization of the memory areas can be realized by using a memory area capable of storing a particular common address as a memory area capable of storing the individual address information.

What is claimed is:

1. A paging receiver having an individual paging number and at least one common paging number, said receiver comprising:
   first memory means including an individual memory area for storing at least one message signal following said individual paging signal, and a specific memory area for selectively storing one of a message signal following said common paging number and a message signal following said individual paging number;
   second memory means for storing information which indicates whether or not said receiver is set to receive a message signal following said common paging number; and
   control means responsive to the content of said second memory for making said specific memory area store a message signal following said individual paging number when said receiver is not set to receive a message signal following said common paging number and for making said specific memory area store a message signal following said common paging number when said receiver is set to receive the message signal following said common paging number.

2. The receiver according to claim 1 further comprising means for decoding said message signal to obtain informaiton which determines whether said service of said common paging number is to be rendered or not.

3. The receiver according to claim 1 wherein said control means comprises means responsive to the information stored in said second memory means for producing one of a logic "0" and a logic "1", means for storing a message signal following said common paging number in response to one of said logic "0" and "1" and storing a message signal following said individual paging number in response to the other of said logic "0" and "1".

4. The receiver according to claim 1 which further comprises display or alerting means actuated by a message processing unit storing a message signal.

* * * * *

UNITED STATES PATENT AND TRADEMARK OFFICE
CERTIFICATE OF CORRECTION

PATENT NO. : 4,786,901

DATED : November 22, 1988

INVENTOR(S) : Matai et al

It is certified that error appears in the above-identified patent and that said Letters Patent is hereby corrected as shown below:

On the title page, item [21] Appl. No.: "89,227" should read --80,227--.

Signed and Sealed this

Eleventh Day of August, 1992

Attest:

DOUGLAS B. COMER

*Attesting Officer*     *Acting Commissioner of Patents and Trademarks*